United States Patent
Nauman et al.

[15] 3,668,161
[45] June 6, 1972

[54] DEVOLATILIZATION OF LIQUID POLYMER COMPOSITIONS

[72] Inventors: Edward B. Nauman; Ted T. Szabo, both of Martinsville, N.J.; Felix P. Klosek, South Charleston, W. Va.; Stephen Kaufman, Somerville, N.J.

[73] Assignee: Union Carbide Corporation, New York, N.Y.

[22] Filed: June 9, 1969

[21] Appl. No.: 831,353

[52] U.S. Cl............................260/2.5 E, 159/2 MS, 159/47 R, 260/2.5 HA, 260/2.5 HB, 260/2.5 R, 260/79.3 A, 260/88.1 R, 260/94.9 F, 260/96 R, 260/892
[51] Int. Cl.......................................C08f 47/10, B01d 11/04
[58] Field of Search............260/2.5 R, 2.5 E, 94.9 F, 79.3 A, 260/88.1 R, 892, 96 R; 159/47

[56] References Cited

UNITED STATES PATENTS

| | | |
|---|---|---|
| 3,357,900 | 12/1967 | Snell......................................159/2 MS |
| 3,201,365 | 8/1965 | Charlesworth et al..............260/94.9 F |
| 3,476,736 | 11/1969 | Kahre....................................260/94.9 F |
| 3,234,994 | 2/1966 | Dance..........................................159/47 |
| 3,250,313 | 5/1966 | Irvin............................................159/47 |
| 3,434,523 | 3/1969 | Ceausescu et al. .......................159/47 |

Primary Examiner—Samuel H. Blech
Assistant Examiner—Wilbert J. Briggs, Sr.
Attorney—Paul A. Rose, Gerald R. O'Brien, Jr. and Aldo J. Cozzi

[57] ABSTRACT

A method is provided for separating volatiles from a liquid composition containing polymer and volatile constituents when composition is passed thru a flash first devolatilization zone maintained at reduced pressure to vaporize and remove volatile constituents and produce a partially devolatilized composition, said partially devolatilized composition is heated and dispersed with foaming agent, and is passed thru a second flash devolatilization zone maintained at reduced pressure to vaporize and remove remaining volatile constituents and produce a finally devolatilized composition.

5 Claims, 2 Drawing Figures

INVENTORS
EDWARD B. NAUMAN
TED T. SZABO
FELIX P. KLOSEK
STEPHEN KAUFMAN
BY
ATTORNEY

DEVOLATILIZATION OF LIQUID POLYMER COMPOSITIONS

This invention relates to a method for separating polymer from a liquid composition containing polymer and volatile constituents.

In the preparation of polymers as in bulk and solution polymerization or by other conventional methods, considerable amounts of starting materials, such as unreacted monomer or solvent, remain admixed or entrained in the polymer product. This contamination of polymer is undesirable because of adverse effects on polymer properties as is well known in the art. A common method of separating the polymer from such fluid compositions is the devolatilization thereof.

One such devolatilization process and apparatus is disclosed in U.S. Pat. No. 3,395,746 to T. T. Szabo et al., issued on Aug. 6, 1968, and titled "Method for Devolatilizing Liquid Polymer Compositions." As there disclosed, a method is provided for devolatilizing polymer solutions by flashing the polymer solution in a low pressure chamber to form a foamy polymer strand freely descending therein and mechanically compressing the strand in the nip of a pair of rolls.

Another method and apparatus for effecting such devolatilization is disclosed in U.S. Patent application Ser. No. 605,319, filed on Dec. 28, 1966 by T. T. Szabo et al., and titled "Method and Apparatus for Devolatilizing Liquid Polymer Compositions." As disclosed therein, method and apparatus are provided for the devolatilization of polymer solutions employing tapered screw means mounted in a close fitting barrel; the barrel being maintained at reduced pressure. The solution is fed to the barrel, foams, the foam is compacted as it is moved along the tapered screw, vapors are drawn off and concentrated polymer is discharged from the apparatus.

While these prior devolatilization methods and apparatus are effective in providing for the devolatilization of liquid polymer compositions, they do present some inherent process limitations.

The removal of contained volatiles from polymeric solutions is critical to the quality of the final polymer product and such removal is, therefore, essential. As a result, devolatilization has been, to a noticeable degree, a factor in limiting overall polymer production capacity. In recent years, it has been desired to increase the production capacity of existing plants and to provide new plants capable of greater production capacity.

In the operation of prior art devolatilization process and apparatus, such as referred to hereinabove, at higher throughput rates required for increased production capacity, it has only been found possible to reduce the contained volatiles from about 15–30 percent down to about 1–3 percent. It has been found, however, that reduction of contained volatiles must be effected to a level below 1 percent and preferably below 0.5 percent. Accordingly, it is desired to provide a process which rapidly and more effectively carries out the devolatilization in order to minimize the production capacity limitations imposed on the overall process.

It is, therefore, a prime object of the present invention to provide a process which is capable of more rapidly and effectively carrying out the devolatilization of polymer-containing solutions in order to realize higher throughput rates and consequent increased production capacity. Other aims, objects and advantages of the present invention will be apparent from the following description and appended claims.

In accordance with the present invention, a method is provided for separating volatiles from a liquid composition containing polymer and volatile constituents comprising passing said composition thru a first devolatilization zone maintained at reduced pressure to vaporize and remove volatile constituents and produce a partially devolatilized composition, heating said partially devolatilized composition, introducing a foaming agent into said partially devolatilized composition, and passing said partially devolatilized composition thru a second devolatilization zone maintained at reduced pressure to vaporize and remove remaining volatile constituents and produce a finally devolatilized composition.

Apparatus is provided for separating volatiles from a liquid composition containing polymer and volatile constituents comprising: first devolatilization chamber means maintained at relatively reduced pressure and containing composition inlet means, venting means and compaction means associated with the outlet thereof; second devolatilization chamber means maintained at relatively reduced pressure and containing composition inlet means, venting means and compaction means associated with the outlet thereof; and heating and foaming agent disperser means positioned intermediate of said first devolatilization chamber means and second devolatilization chamber means for interstage heating and dispersing foaming agent into said composition between first-stage and second-stage devolatilization.

The invention will become more apparent in the following detailed specification and drawings, in which.

Figure 2:
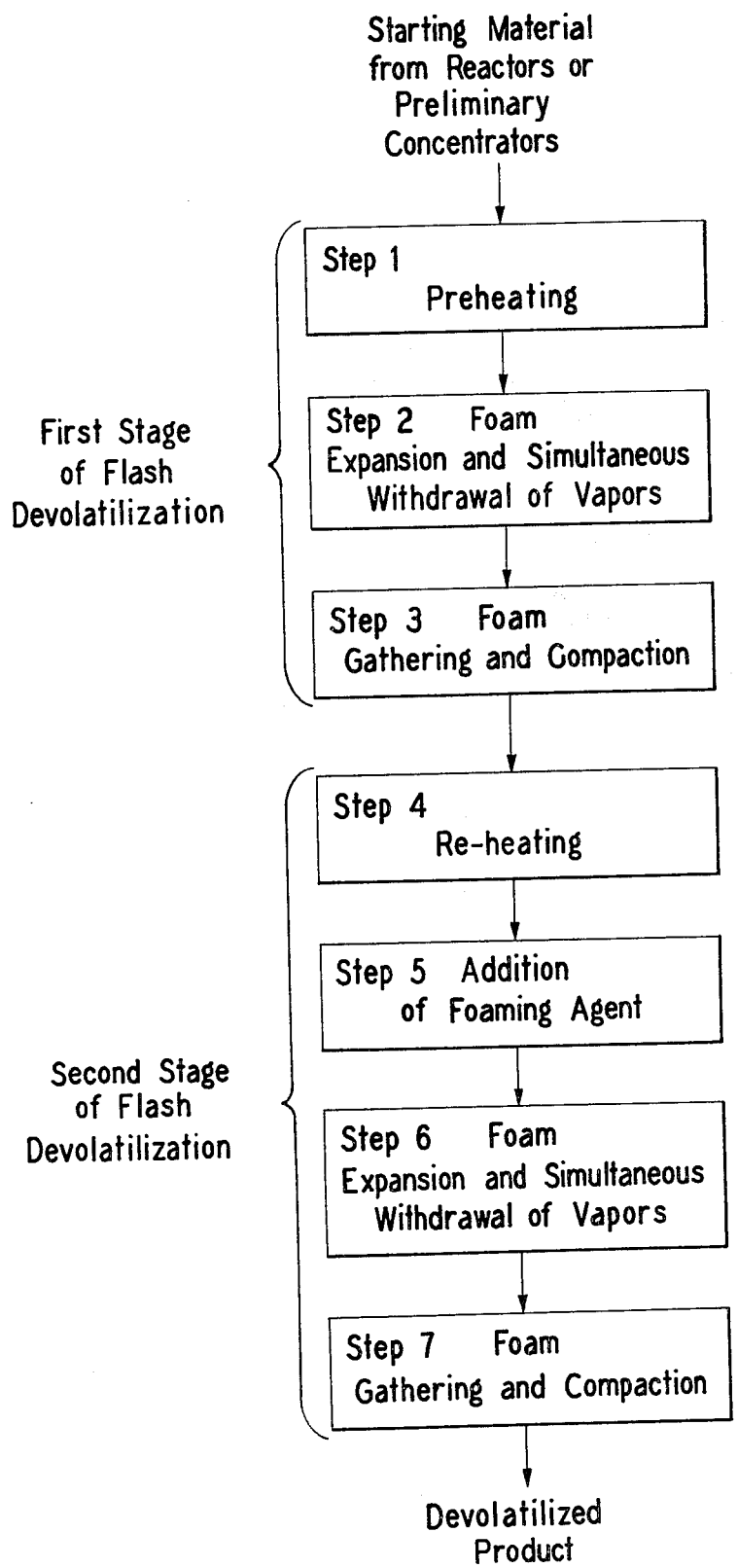
FIG. 2 is a flow sheet setting forth the steps of the process of the invention.

Referring specifically to the figures of the drawings, volatile-containing polymer solution is first preheated in a suitable preheater, as referred to as Step 1 in the flow sheet of FIG. 2 of the drawings. The preheated polymer solution is then introduced into a first flash devolatilizer or devolatilization chamber, maintained at reduced pressure, whereupon the contained volatiles are vaporized and vented from the chamber and the polymeric solution is foamed, thereby assisting the further release of contained volatiles (step 2).

The foamed polymer is then gathered and compacted upon discharge from the devolatilization chamber.

The devolatilization step and subsequent foam gathering and compaction step (step 3) may be carried out in any one of a number of methods already known to the art. Two such methods are disclosed in the patent and application referred to hereinabove (U.S. Pat. No. 3,395,746 and U.S. patent application Ser. No. 605,319).

The compacted foam is then reheated (step 4) in any convenient manner known to the art and a foaming agent is added (step 5) through suitable disperser means.

The introduction of foaming agents, such as water, into polymeric solutions in order to attain higher subsequent devolatilization efficiency has been disclosed and claimed in copending U.S. patent application Ser. No. 693,083, filed on Dec. 26, 1967 by T. T. Szabo, and titled "Devolatilization Method." In such method, the foaming agent is mixed with the solution prior to feeding of the solution to a devolatilization chamber, as disclosed in the prior art. Suitable apparatus for dispersing such foaming agent in the polymer solution is disclosed and claimed in co-pending U.S. patent application Ser. No. 704,639, filed Feb. 12, 1968 by W. J. Klingebiel, and titled "Disperser Device." As disclosed therein, a method is provided for randomly dispersing fluid throughout high viscosity polymer melt or solution by introducing a mixture of fluid and high viscosity polymer melt or solution into a mixing zone, forcing the mixture through rapidly rotating apertures, and subjecting the mixture to an intense shear gradient followed by mixing characterized by viscoelastic secondary flow. A device is also provided for dispersing a fluid throughout a polymer melt or solution having a cylindrical barrel having therein at least one rotatable disc dispersion unit having an alternating series of perforated-solid-perforated discs.

After the addition of foaming agent (step 5), the polymeric material is fed to a second flash devolatilization chamber (step 6), maintained under conditions of operation similar to the first-stage devolatilization chamber described hereinabove. Subsequent to devolatilization in the second devolatilization chamber, the resulting foam is again gathered and compacted (step 7) to provide the final devolatilized product.

In general, there is a need to heat the polymer solution prior to either foaming step. This heat must supply at least part of the latent heat of vaporization of the volatile components such that, after the flash, the temperature of the resulting polymer solution is above its glass transition point. This gives an open-celled foam structure which allows escape of the vapors. Note that this minimum limit on temperature applies to the foamed material after the flash. Temperatures higher than this minimum value are advantageous since they lower the equilibrium volatile concentration of the foamed product. Also, it is probable that they give some improvement in foam structure. The process itself does not impose any definite upper limit on temperature. For specific polymer systems, the upper limit on temperature will be fixed by questions of thermal stability or by additional polymerization occurring in the heating device.

Concerning the need for interstage injection of a foaming agent, the function of this agent is twofold:

1. To generate a larger volume of foam (and thus a larger surface area) than is possible (at the same temperature and pressure) with only the volatile components which would otherwise be present.

2. To lower the partial pressure of the other volatile components (residual volatiles) and thus to reduce their equilibrium concentrations in the foamed polymer solution.

It is possible to achieve some reduction in residual volatiles during a second flash without injection of the foaming agent. Whether or not this reduction is sufficient depends on the quality control specifications for that product. In all three example systems set forth hereinbelow, the injected foaming agent (water in these cases) does make a definite contribution to devolatilization efficiency. Using the polystyrene example given in Example I, running at similar conditions but without injected water gave residual styrene concentrations of about 1 percent. Water injection reduced this to 0.2 percent.

It has been found, with respect to the sequence of the heating and dispersing steps of the method of the present invention (steps 4 and 5), that the most convenient sequence is to first effect the intermediate stage heating of the polymer solution prior to dispersing the foaming agent in the polymeric solution. It is, however, possible to reverse the order of these steps and first disperse the foaming agent and then heat the polymeric solution prior to second-stage devolatilization. In this case, however, it will be necessary to effect heating and subsequent second-stage devolatilization at much higher pressures than would be required by the preferred sequence of steps.

Figure 1:
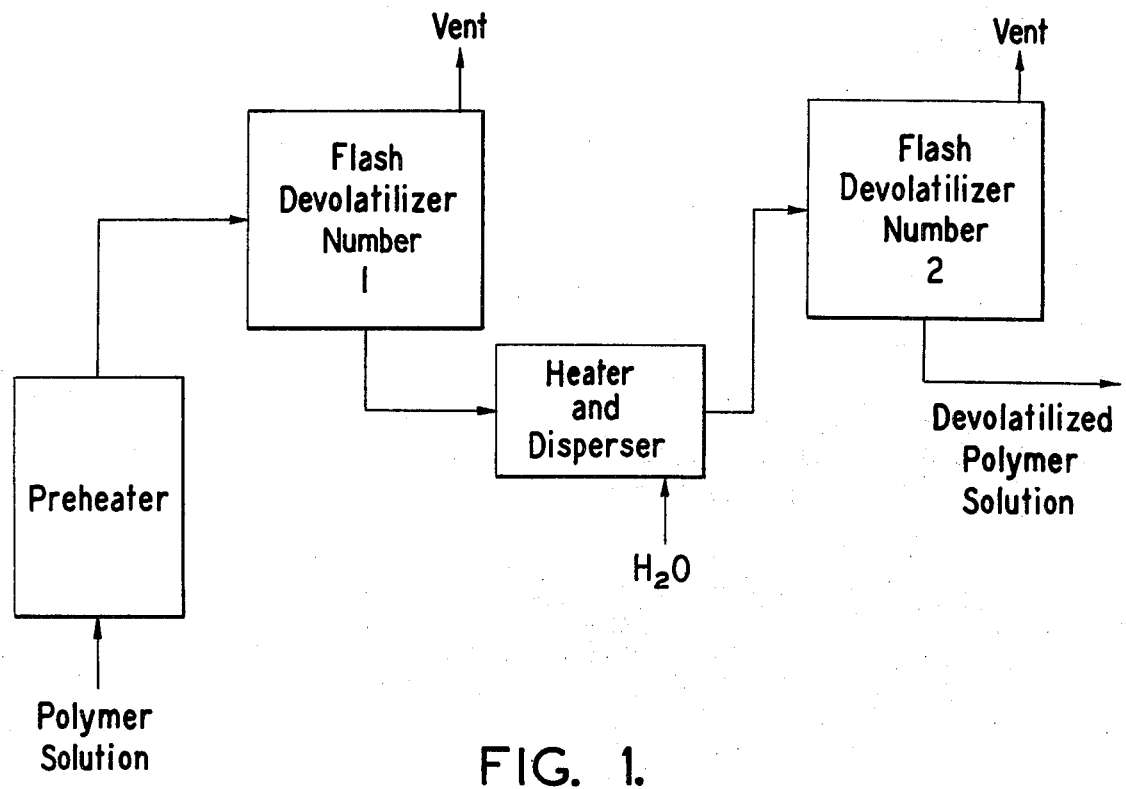
FIG. 1 is a flow sheet representing the assembly of apparatus capable of carrying out the invention.
Figure 3:
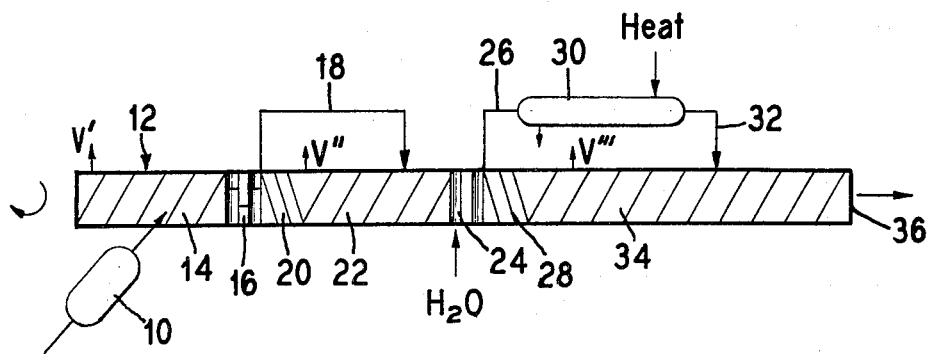
FIG. 3 is a schematic sectional view of unitary apparatus capable of carrying out the devolatilization process of the invention.

Referring specifically to the unitary apparatus modification shown in FIG. 3 of the drawings, polymeric material is preheated in heater 10 and introduced into the unitary devolatilizing extruder 12. It is introduced approximately midway along the length of first devolatilizing screw flight 14 so that the volatiles released upon compaction by the screw extruder can pass rearwardly to the venting means V' and be removed from the devolatilizing extruder.

The polymeric solution passes forwardly thru kneading block assembly 16 and is discharged from the devolatilizing extruder 12 through first bypass line 18 by the action of the reverse pitch screw flight 20. The material is then forwardly advanced through line 18 and reintroduced into the devolatilizing extruder 12 at about the middle of the second devolatilizing screw flight 22 to provide further compaction and the further release of contained volatiles which pass rearwardly to venting means V" and from the devolatilizing extruder 12. The material is then passed to the spinning disc disperser section 24 in which the foaming agent, such as water, is added.

Polymeric solution is then again discharged from the devolatilizing extruder through second bypass line 26 by the action of second reverse pitch screw flight 28. A second stage of heating is then effected in heater 30, whereupon the material is reintroduced into the devolatilizing extruder 12 thru line 32. The reintroduction is effected at a point approximately midway along the third devolatilization screw flight 34 to produce the final removal of volatiles which pass rearwardly along the screw flight to vent means V''' and from the devolatilizing extruder 12. The finally-devolatilized product is discharged from the devolatilization extruder 12 thru production outlet means 36.

The method of the present invention is applicable to the devolatilization of a wide variety of polymeric solutions. Examples of the devolatilization of representative polymeric solutions are set forth hereinbelow, wherein the step references are to the steps as numbered in FIG. 2 of the appended drawings.

EXAMPLE I

Starting Material
 Rubber-modified polystyrene
 20 percent residual styrene
 170° C.
At End of Step
 1. 200° C., some decrease in styrene content due to additional polymerization
 2. ≈2 percent residual styrene
 ≈180° C.
 100 mm. Hg.
 3. 2 percent residual styrene
 200° C.
 Note that some reheating is accomplished by mechanical input during foam compaction. Also, mechanical milling may give some reduction in residual styrene.
 4. ≈2 percent residual styrene
 250° C.
 Polymerization during this step may give a slight decrease in residual styrene.
 5. ≈2 percent residual styrene
 1 percent water
 ≈245° C.
 600 psig
 6. ≈0.2 percent residual styrene
 little residual water
 ≈225° C.
 10 mm. Hg.
 7. 0.2 percent residual styrene } finally-devolatilized product
 250° C.

EXAMPLE II

Starting Material
 polysulfone
 30% residual monochlorobenzene
 150°–160° C.
At End of Step
 1. 190°–200° C.
 2. ≈1.3% residual monochlorobenzene
 170°–180° C., atmospheric pressure
 3. ≈1.3% residual monochlorobenzene
 220° C.
 Reheating accomplished by mechanical input during foam compacting.
 4. ≈1.3% residual monochlorobenzene
 320° C.
 5. ≈1.3% residual monochlorobenzene
 0.36–1.3% water
 230°–280° C.
 6. 0.048–0.065% residual monochlorobenzene
 little residual water
 230°–280° C.
 300 mm. Hg.
 7. 0.048–0.065% residual monochlorobenzene pp 310° C. } finally-devolatilized product

EXAMPLE III

Starting Material
 copolymer of acrylic acid and ethylene
 3% residual acrylic acid
 200° C., 1,000 psig At End of Step
1. 200° C.
1,000 psig
2. 0.24–0.65% residual acrylic acid
180° C., atmospheric pressure
3 & 4. 0.24–0.65% residual acrylic acid
200° C.
5. 0.24–0.65 % residual acrylic acid
200° C.
1.0–3.2% water
410–500 psig
6. 0.05–0.13% residual acrylic acid
little residual water
55–120 mm. Hg.
7. 0.05–0.13% residual acrylic acid } finally-devolatilized product

What is claimed is:

1. The method for separating volatiles from a liquid composition containing polymer and volatile constituents comprising passing said composition thru a first flash devolatilization zone maintained at reduced pressure to vaporize and remove said volatile constituents and produce a partially devolatilized composition, heating and introducing a foaming agent in its liquid state into said partially devolatilized composition whereby said agent is converted to a gaseous state capable of assisting devolatilization, and passing said partially devolatilized composition thru a second flash devolatilization zone maintained at reduced pressure to vaporize and remove remaining volatile constituents and produce a finally-devolatilized composition.

2. The method in accordance with claim 1, wherein said partially devolatilized composition is first heated before the introduction of foaming agent therein.

3. The method in accordance with claim 1, wherein said liquid composition is a rubber-modified polystyrene.

4. The method in accordance with claim 1, wherein said liquid composition is polysulfone.

5. The method in accordance with claim 1, wherein said liquid composition is a copolymer of acrylic acid and ethylene.

* * * * *